United States Patent
Wozniak et al.

(10) Patent No.: US 6,997,415 B2
(45) Date of Patent: Feb. 14, 2006

(54) METHOD AND ARRANGEMENT FOR AIRCRAFT FUEL DISPERSION

(75) Inventors: Gregg Wozniak, Savannah, GA (US); David Lamb, Savannah, GA (US); Dung Le, Pooler, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 10/708,818

(22) Filed: Mar. 26, 2004

(65) Prior Publication Data

US 2005/0139727 A1 Jun. 30, 2005

Related U.S. Application Data

(60) Provisional application No. 60/481,846, filed on Dec. 31, 2003.

(51) Int. Cl.
*B64D 37/00* (2006.01)

(52) U.S. Cl. .................................. 244/135 C

(58) Field of Classification Search ............ 244/135 C, 244/135 R
See application file for complete search history.

(56) References Cited

U.S. PATENT DOCUMENTS

| | | | | |
|---|---|---|---|---|
| 1,996,281 A | * | 4/1935 | Dolan | 244/55 |
| 2,585,480 A | | 2/1952 | Makhonine | |
| 2,860,654 A | * | 11/1958 | Morley et al. | 137/98 |
| 2,926,688 A | * | 3/1960 | Muma et al. | 137/263 |
| 2,955,787 A | * | 10/1960 | Ray et al. | 244/135 R |
| 3,295,799 A | * | 1/1967 | Stoppe | 244/135 R |

* cited by examiner

*Primary Examiner*—Tien Dinh
(74) *Attorney, Agent, or Firm*—Howrey LLP

(57) ABSTRACT

Method and arrangement for dispersing fuel 62 within a fuel containment system 60 of an aircraft 30 including utilizing a fuel containment system on an aircraft that is located at least partially within a wing 34 of the aircraft and defines a reservoir portion 42 and a remote portion 44. Fuel is pumped during at least aircraft flight operation from the reservoir portion to the remote portion at a pumped rate 80, while simultaneously fuel that is contained in the remote portion of the fuel containment system is permitted to drain to the reservoir portion at a drainage rate 82. The drainage rate is less than the pumped rate. A fuel mass 64 is accumulated in the remote portion of the fuel containment system because of a difference between the pumped rate and the drainage rate and as a result, a counteractive moment 49 is induced in the aircraft that is opposingly directed to a lift moment 46 caused by wing-lift 45 during aircraft flight.

19 Claims, 9 Drawing Sheets

METHOD AND ARRANGEMENT FOR AIRCRAFT FUEL DISPERSION

CROSS REFERENCE TO RELATED APPLICATIONS

The present application claims the benefit of U.S. Provisional Application No. 60/481,846 filed Dec. 31, 2003.

BACKGROUND OF INVENTION

1. Field of the Invention

The present invention relates to aircraft fuel systems; and more particularly to aircraft fuel systems having capabilities for strategically storing and distributing fuel about the aircraft in ways that combat stress induced on the airframe by wing-lift.

2. Background

The design process of an aircraft, particularly with respect to the interaction between the fuselage and wing structures, must account for the complex set of loads that will be experienced during operation both on the ground, and in the air, under fully laden conditions. These loads are the result of numerous factors including the airframe weight, the load being carried, and aerodynamic effects imposed upon the aircraft.

In many, if not most designs, the wing also serves as a fuel tank. Traditionally, wing tanks have been established by joining together and sealing certain structural members within the wing and thereby forming a single, large, fuel-carrying volume. The wing's upper and lower aerodynamic surfaces, front and rear spar, and the inner- and outer-most ribs typically define the periphery of a wing fuel tank. Such a tank is sometimes partitioned into a series of smaller, interconnected fuel cells through the presence of baffle ribs placed along the wing chord. To prevent the sudden movement of large fuel quantities during aircraft maneuvers, such baffle ribs can be configured to restrict the migration of fuel from one side of the rib to the other. For positive dihedral wings, gravity continually draws the fuel toward the wing root where the fuel pumps are located and which deliver the fuel from the fuel tank to the aircraft's engine(s) as schematically represented in accompanying FIGS. 2a–2c.

For a given wing design, increasing the aircraft's maximum allowable weight results in an increase in the structural bending moments at the wing root as depicted in accompanying FIGS. 3a–3b where it is illustrated that when aircraft weight is increased, lift on the craft must be commensurately increased to achieve flight. Modifying the wing's primary structure to accommodate the increased loads requires a significant amount of time, cost and effort. As a result, any wing modification must be considered carefully before being initiated. To preclude the burden of modifying a wing's primary structure, design margins are typically "built-in" during the original design phase to allow for future aircraft growth.

A net effect that results in a decrease of wing bending can be achieved by strategically locating mass toward the wing tip to counteract the wing's aerodynamic up-bending as is schematically represented in FIGS. 4a–4c. The premise of the solution of FIG. 4a is embodied in U.S. Pat. No. 2,585,480 where additional mass is taught to be added by the installation of weighty materials that can be moved toward and away from the wing tip. While effective for reducing the upward bending moment, this approach results in reduced aircraft operational capability since an equivalent mass reduction in fuel and/or cargo must be observed.

Another solution is to include multiple, discrete fuel tanks in the wing, and to first utilize the fuel in the most-inboard tank(s) as is schematically represented in FIG. 4b. Another related solution is to have an additional tank at the wing tip in the manner that is schematically represented in FIG. 4c. In both instances, outboard-fuel is maintained to provide the desired structural benefit, while the inboard-fuel is first consumed by the engine(s). During the later stages of the flight mission, the fuel within the outboard tank will be consumed. The use of multiple fuel tanks within a wing has the detrimental effect of increasing parts count, system complexity, failure effects, and pilot workload.

SUMMARY OF INVENTION

The invention provides a method for redistributing the fuel within an existing wing fuel tank so as to provide a desired amount of relief to the upward wing root bending moment, but without requiring a redesign of the wing's primary structure or the addition of multiple fuel tanks. The method incorporates existing fuel ejector pump and float valve technologies to transfer and maintain a quantity of fuel in the outboard portions of a positive dihedral wing fuel tank. Fuel is continually transferred outboard until the system automatically shuts-off responsive to a drop in the fuel level in the wing below a defined minimum value. When shut-off, gravity drains the fuel back to the inboard portion of the wing, making the entirety of the fuel available for consumption by the aircraft's engine(s).

The fuel transfer system and method of the present invention includes a fuel ejector pump and associated plumbing to route fuel from an inboard to an outboard portion of a wing. The fuel ejector pump is located toward the wing root with its discharge routed toward the wing tip as generally depicted in FIGS. 1, 5–6c, and 8. To maintain fuel in the outboard tank, the system transfers fuel outboard at a greater flow rate than what is allowed to drain back toward the wing root. In a preferred embodiment, this is accomplished by modifying at least one baffle rib near the wing tip by restricting inboard flow passages through the baffle rib. By doing so, the fuel cells outboard of the modified baffle rib will behave similar to a separate fuel tank under certain conditions, and is therefore henceforth referred to as the "outboard tank." Fuel is continually transferred to the outboard tank until such a time, that because of engine fuel burn, an included float valve changes state (from open to closed) and the fuel ejector pump ceases to flow.

Without fuel replenishment, gravity will completely drain the outboard tank so there is no increase to the amount of unusable fuel in the wing. In the event of a float valve failure (stays open), the ejector pump will cease to transfer fuel once through engine fuel burn the ejector pump inlet comes out of submersion. As before, without fuel replenishment the outboard tank will completely drain.

In summary, the advantages and novel features include reduction of wing root structural loads without requiring the addition of significant mass, cost and/or complexity to the aircraft, which existing methods are incapable of addressing. The invention allows a single fuel tank in a positive dihedral wing to provide the structural benefits of a multiple tank design without relying on a significant structural modification to achieve the same. In a further aspect, the invention operates (turns on and off) automatically, thus requiring no increase in pilot workload. In another aspect, the invention is a low weight, high reliability design with benign failure modes. There is only one moving part (the float valve) and has no electrical parts making it inherently safe for fuel system applications, and the invention occupies a negligible volume in the fuel tank and therefore allows full usage of the usable wing volume when traded off with payload (Zero Fuel Gross Weight).

DETAILED DESCRIPTION

Figure 1:
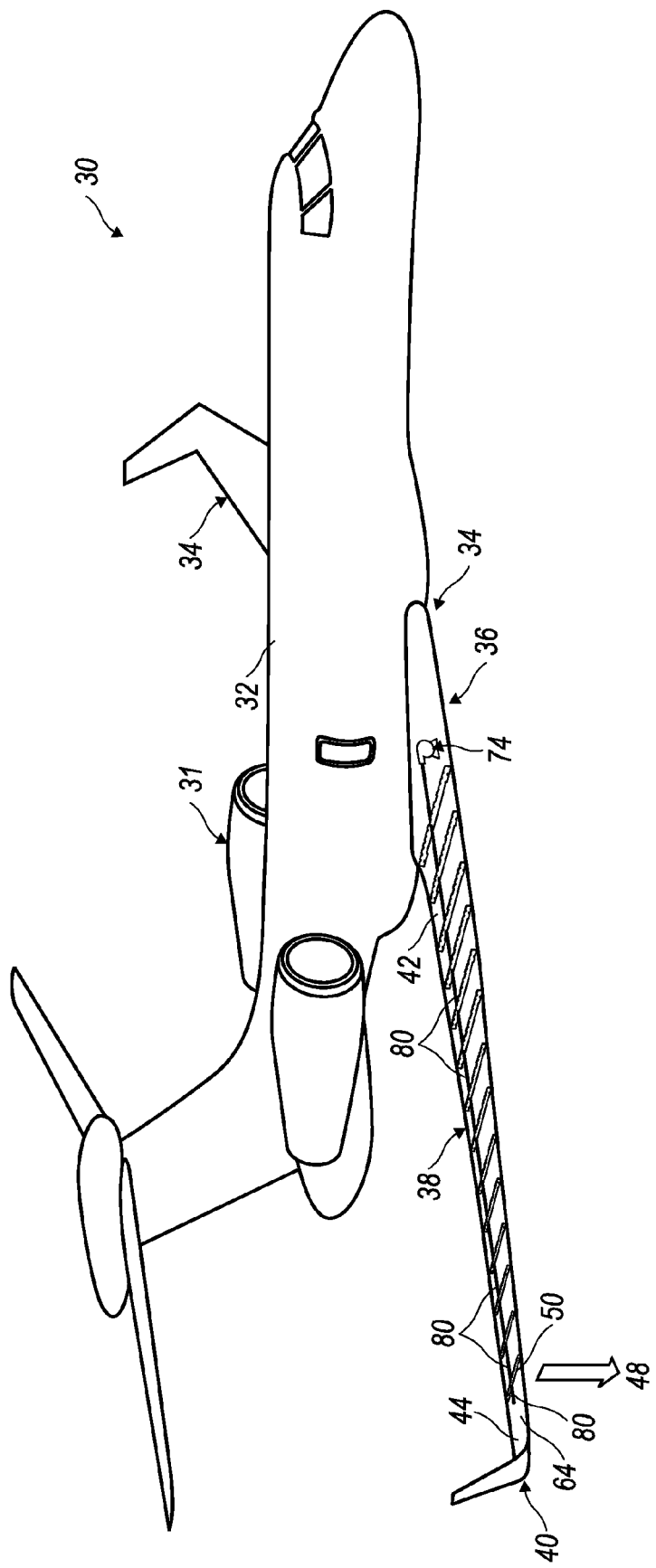
FIG. 1 is a perspective view of one embodiment of the present invention.
Figure 2A:
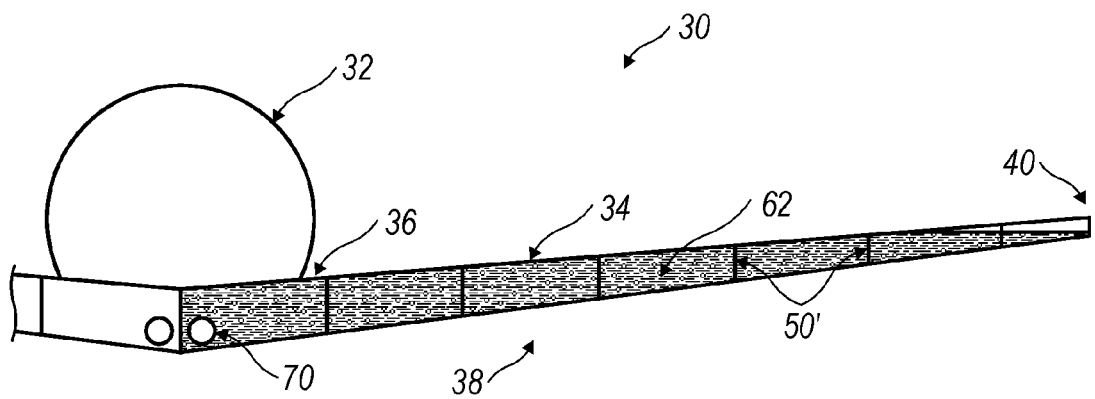
FIGS. 2a–2c schematically represent performance situations occurring in related systems of conventionally designed aircraft.
Figure 2B:
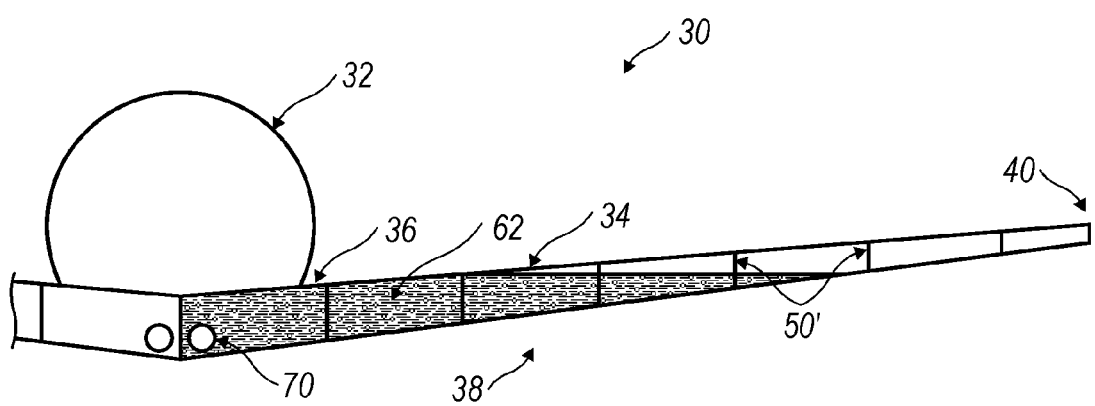
Figure 2C:
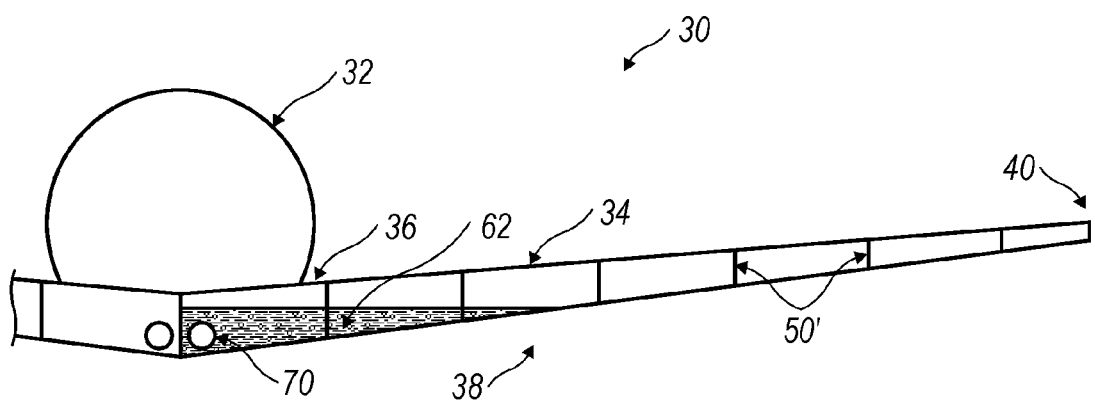
Figure 3A:
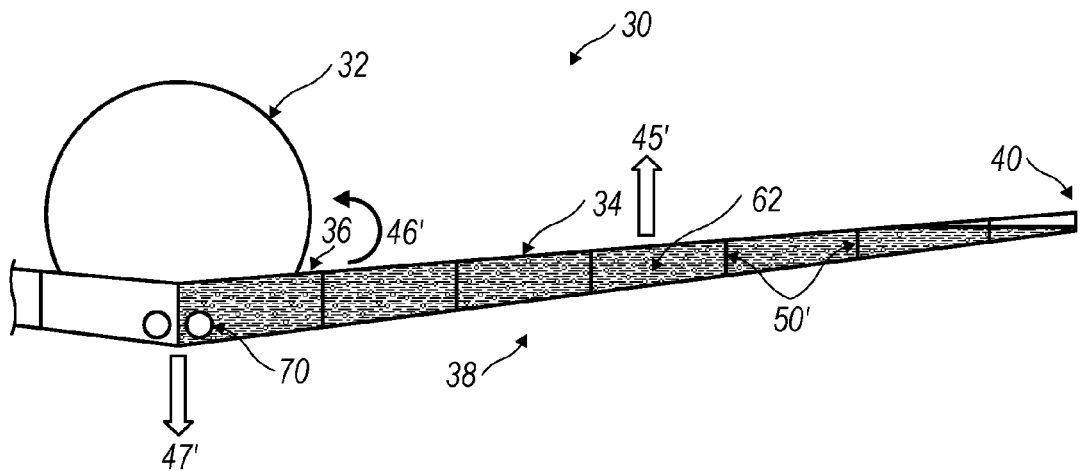
FIGS. 3a–3b schematically contrast a design-loaded aircraft (3a) compared to an increased-load aircraft (3b) of similar design depicting forces and moments acting thereupon.
Figure 3B:
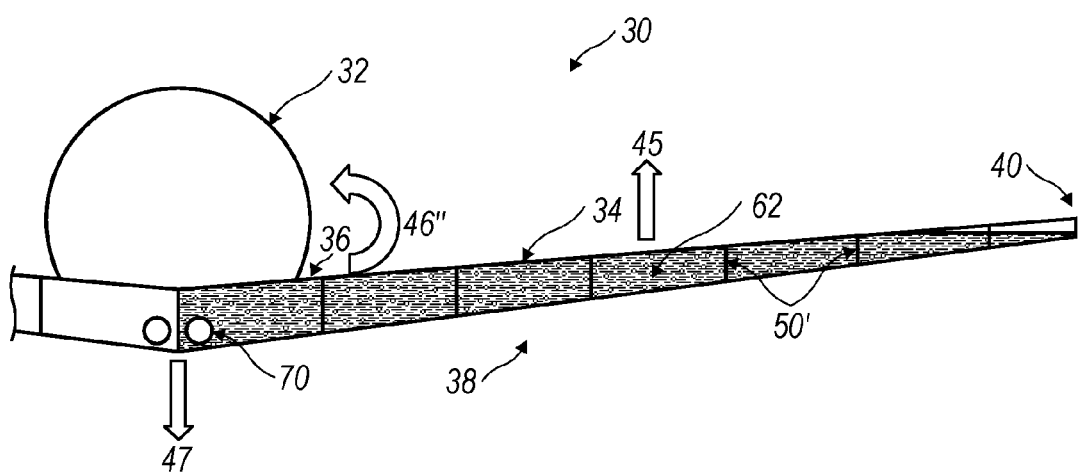
Figure 4A:
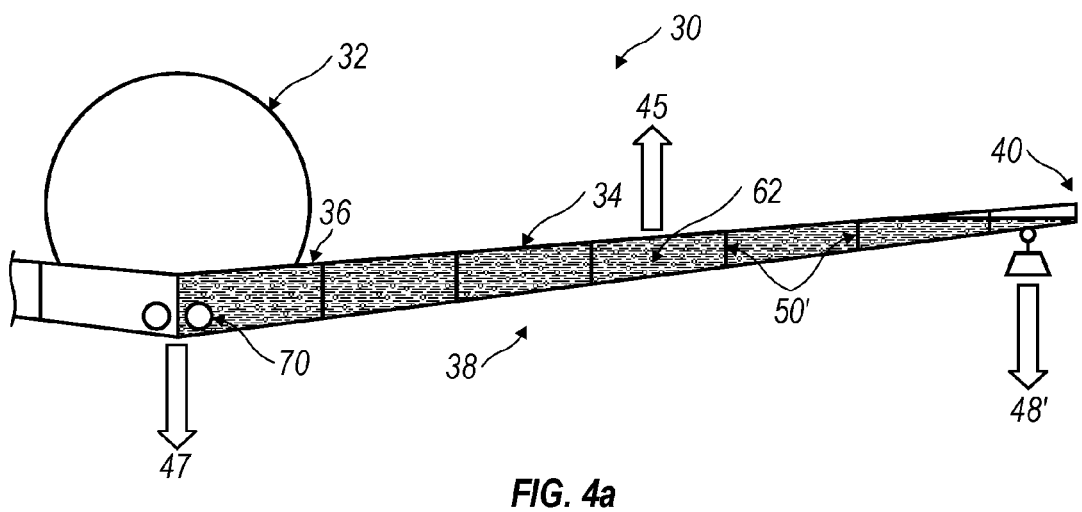
FIGS. 4a–4c schematically represent previous, and less desirable attempts to solve the deficiencies addressed by the present invention.
Figure 4B:
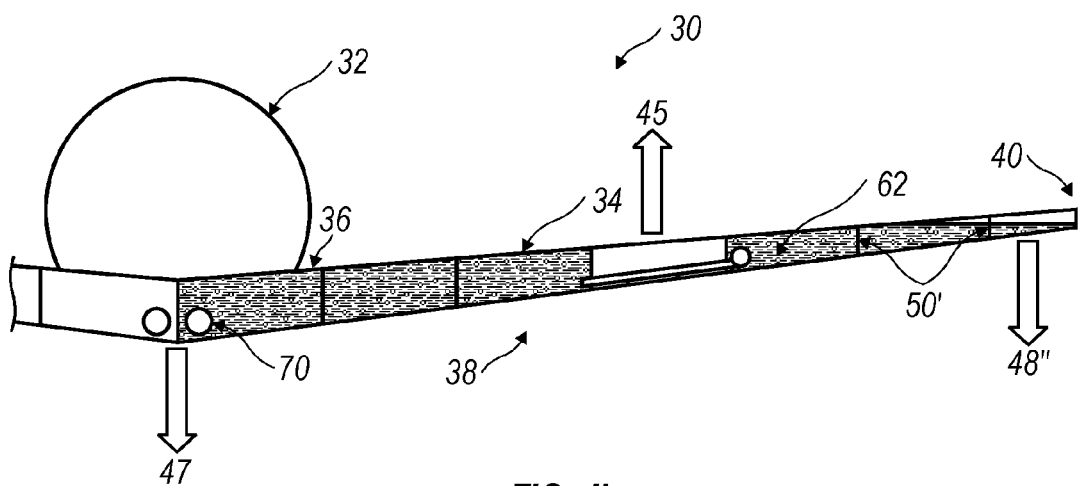
Figure 4C:
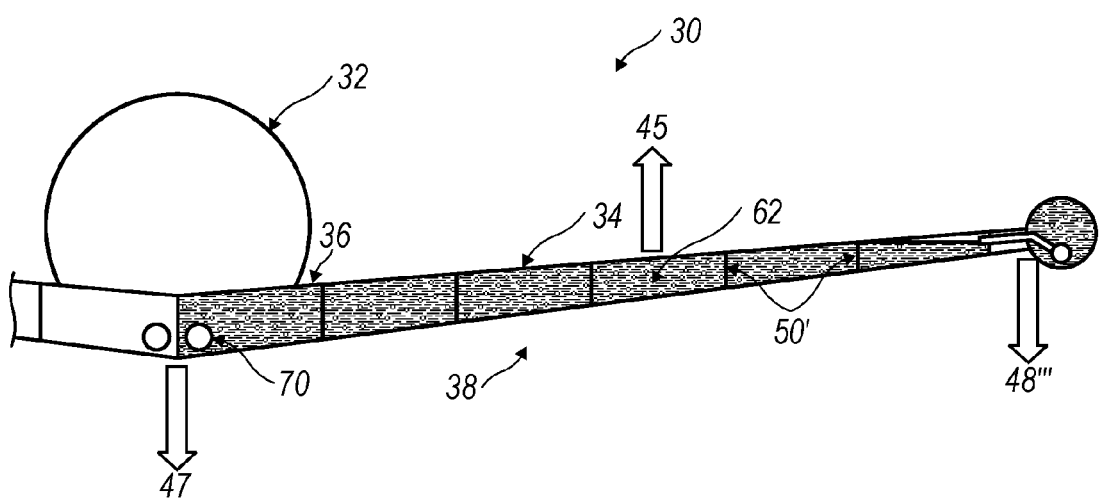
Figure 5:
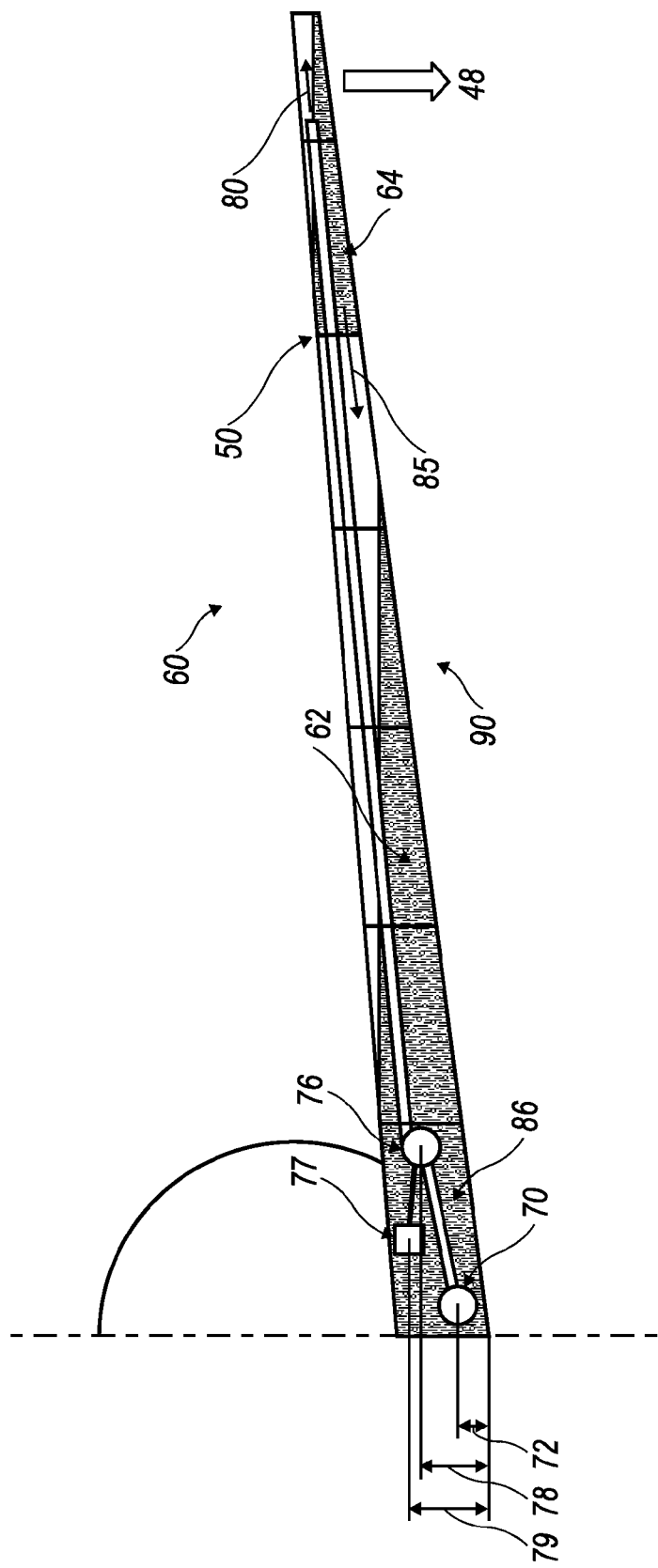
FIG. 5 is an elevational schematic primarily illustrating relative positions (with respect to height or elevation) of components of the present invention.
Figure 6A:
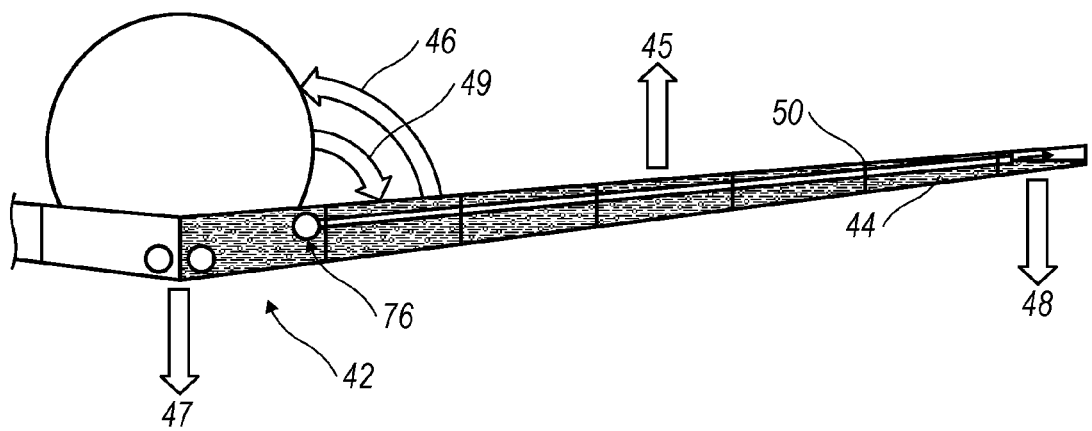
FIGS. 6a–6c are a series of elevational schematics illustrating progressive operation (fuel reduction) of a fuel containment system configured according to the present invention.
Figure 6B:
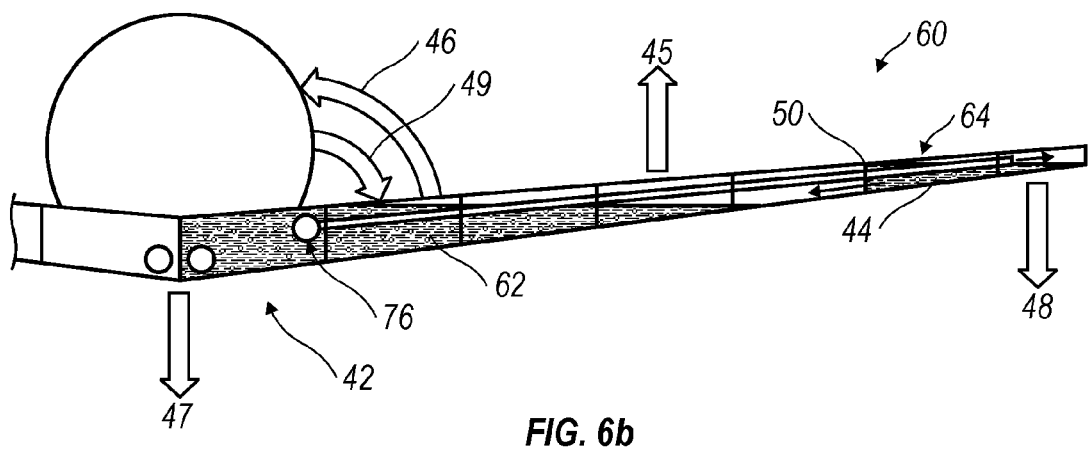
Figure 6C:
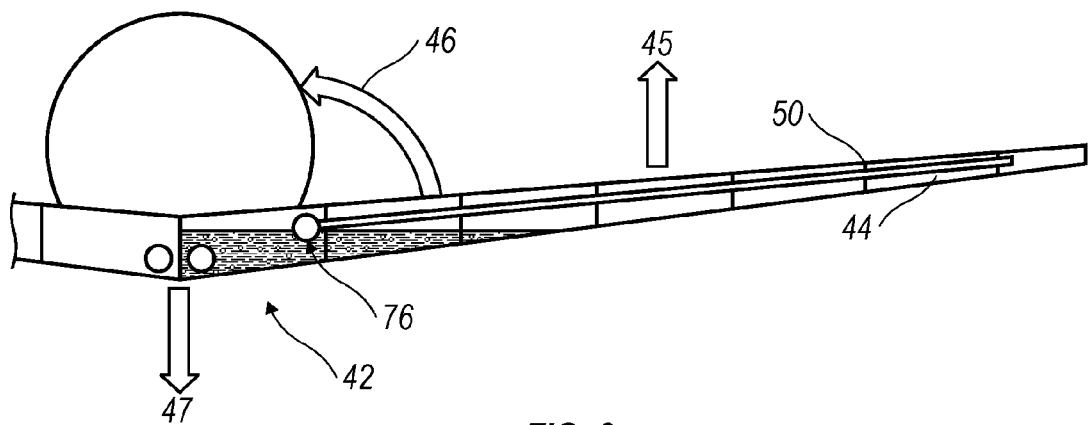
Figure 7:
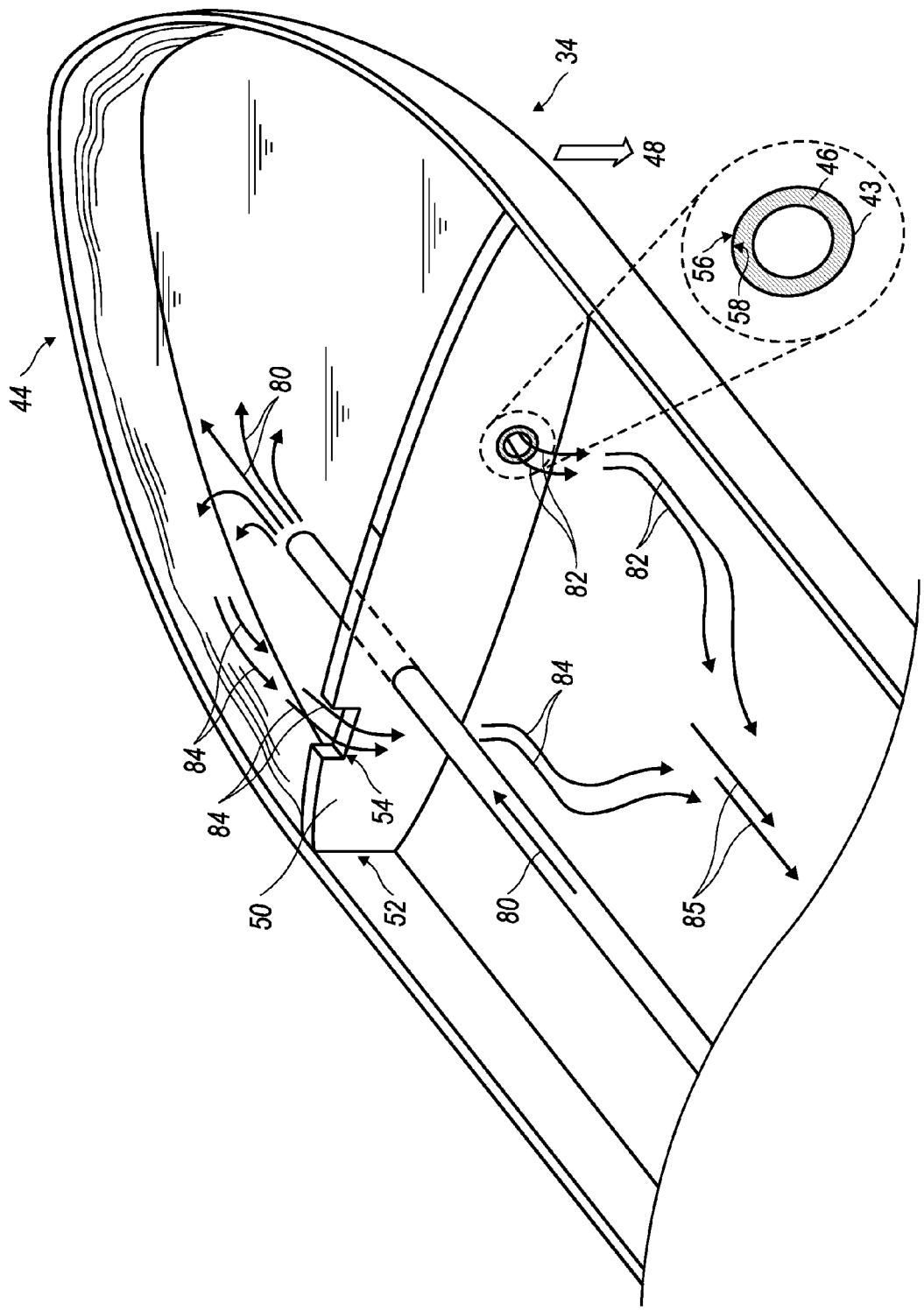
FIG. 7 is an illustrative perspective view showing in detail features of the present invention that are located in the vicinity of the wing tip.
Figure 8:
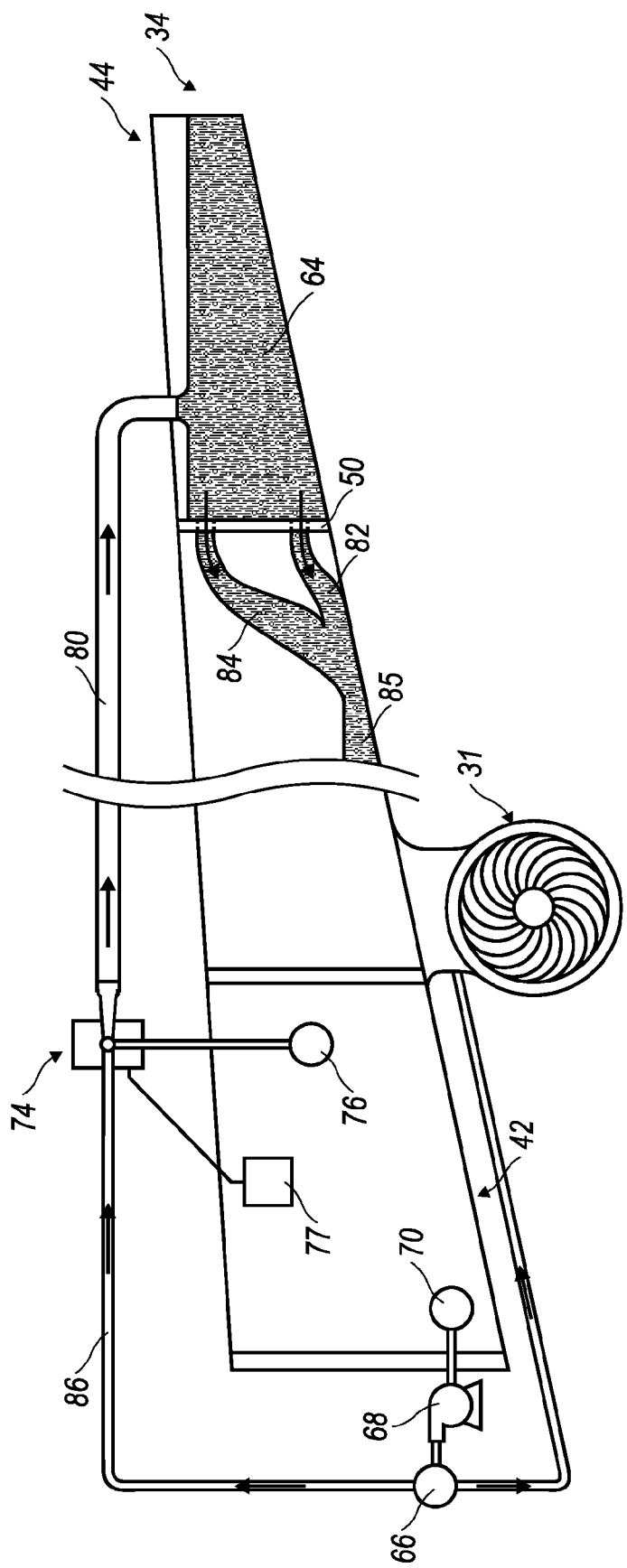
FIG. 8 is an elevational schematic illustrating steady-state operation of a fuel containment system configured according to the present invention (with fuel depicted in the vicinity of the wing tip, but deleted in the vicinity of the wing root for purposes of clarity.
Figure 9:
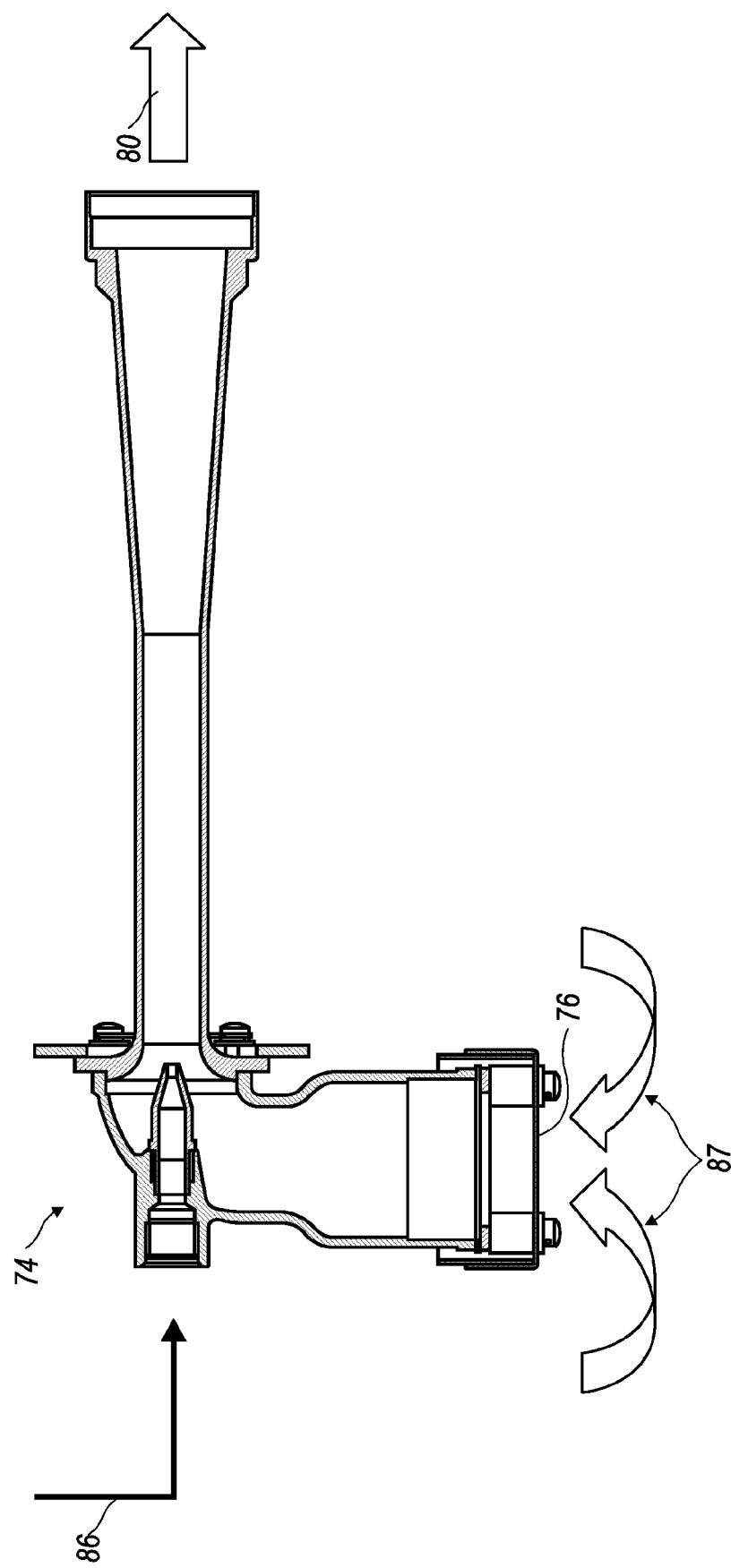
FIG. 9 is a detailed, substantially cross-sectional view of an exemplary ejector pump utilizable in the present invention.

In at least one embodiment, the present invention takes the form of a method for dispersing fuel 62 within a fuel containment system 60 of an aircraft 30. As typical, the aircraft is contemplated to include, wings 34, a fuselage 32 and engines 31. Each wing 34 has a tip 40, root 36 and mid-section 38. The steps of the method comprise (includes, but is not limited to) utilizing a fuel containment system on an aircraft that is located at least partially within a wing 34 of the aircraft and defines a reservoir portion 42 and a remote portion 44. Fuel is pumped during aircraft flight operation and ground operation from the reservoir portion to the remote portion at a pumped rate 80, while simultaneously fuel that is contained in the remote portion of the fuel containment system is permitted to drain to the reservoir portion at a drainage rate 85 (82+84). The drainage rate 85 is less than the pumped rate 80.

A fuel mass 64 is accumulated in the remote portion of the fuel containment system because of a difference between the pumped rate and the drainage rate and as a result, a counteractive moment 49 is induced in the aircraft that is opposingly directed to a lift moment 46 caused by wing-lift 45 during aircraft flight. The weight of the aircraft constitutes a force 47, and the accumulated fuel mass also generates a downward counteracting mass force 48 that induces a counteracting bending moment 49 in the aircraft.

A pressured fuel supply 66 provides a divided portion 86 therefrom that is utilized to exclusively power the pumping of fuel from the reservoir portion to the remote portion.

An ejector pump 74 that is powered by the pressured fuel supply pumps fuel from the reservoir portion to the remote portion.

A fuel pump 68 is employed to establish the pressured fuel supply, the fuel pump having a fuel inlet 70 positioned in the reservoir portion at an elevation, relative to the reservoir portion, that defines a fuel pump inlet elevation 72.

The ejector pump is configured so that an ejector pump inlet 76 is positioned in the reservoir portion at an elevation, relative to the reservoir portion, that defines an ejector pump inlet elevation 78.

The ejector pump inlet elevation is arranged higher than the fuel pump inlet elevation within the reservoir portion.

It is detected when fuel in the reservoir portion falls below a predetermined level 79, the predetermined level being higher, relative to the reservoir portion, than the fuel pump inlet elevation.

The ejector pump is selected to pump at a multiplicative rate 80 of a powering pressured rate 86 supplied thereto.

In a preferred embodiment, the ejector pump has a capacity to deliver a pumped rate 80 of approximately ten times the powering pressured rate 86 supplied thereto with an additive rate 87 of approximately ten times the powering pressured rate 86.

A flow-impeding partition 50 is utilized in the fuel containment system, the flow-impeding partition being configured to establish the drainage rate.

The flow-impeding partition is preferably established by adaptation of a structural rib within the wing of the aircraft.

A recess 54 is employed in a top portion 52 of the flow-impeding partition thereby establishing an overflow weir which during steady-state dispersion 90 of fuel to the remote portion of the fuel containment system, establishes an overflow rate 84 of fuel that spills thereover. The overflow rate 84, together with a simultaneously occurring drainage rate 82 establish a return rate 85 of fluid to the reservoir portion that substantially equals a simultaneously occurring pumped rate 80.

The drainage rate is controlled by adaptation to an aperture 56 through the flow-impeding partition. Preferably, the adaptation is accomplished to the aperture by restriction of flow therethrough by reduction of an open area thereof. As an example, this is accomplished by locating a tubing segment 46 in the aperture thereby restricting flow through the aperture.

The tubing segment is selected to be composed of at least semi-flexible material and having an outer periphery 43 that establishes a conformance-fit with an inner periphery 58 of the aperture upon location by insertion of the tubing segment into the aperture.

In one embodiment, the pumped rate is selected to be approximately twice the drainage rate.

In a preferred embodiment, the pumping of fuel from the reservoir portion to the remote portion is caused to automatically begin, without input from an operator, upon the pressured fuel supply's initiation.

What is claimed is:

1. A method for dispersing fuel within a fuel containment system of an aircraft comprising:
utilizing a fuel containment system on an aircraft, said fuel containment system being located at least partially within a wing of an aircraft and defining a reservoir portion and a remote portion;

pumping fuel at least during aircraft flight from said reservoir portion to said remote portion at a pumped rate;

permitting simultaneous drainage of fuel contained in said remote portion of said fuel containment system to said reservoir portion at a drainage rate, said drainage rate being less than said pumped rate; and accumulating a fuel mass in said remote portion of said fuel containment system because of the difference between said pumped rate and said drainage rate and thereby inducing a counteractive moment in the aircraft opposingly directed to a lift moment caused by wing-lift during aircraft flight.

2. The method as recited in claim 1, further comprising:
utilizing a pressured fuel supply to exclusively power said pumping of fuel from said reservoir portion to said remote portion.

3. The method as recited in claim 2, further comprising:
employing an ejector pump, powered by said pressured fuel supply, to pump fuel from said reservoir portion to said remote portion.

4. The method as recited in claim 3, further comprising:
employing a fuel pump to establish said pressured fuel supply, said fuel pump having a fuel inlet positioned in said reservoir portion at an elevation, relative to said reservoir portion, that defines a fuel pump inlet elevation.

5. The method as recited in claim 4, further comprising:
configuring said ejector pump so that an ejector pump inlet is positioned in said reservoir portion at an elevation, relative to said reservoir portion, that defines an ejector pump inlet elevation.

6. The method as recited in claim 5, further comprising:
arranging said ejector pump inlet elevation higher than said fuel pump inlet elevation within said reservoir portion.

7. The method as recited in claim 6, further comprising:
detecting when fuel in said reservoir portion falls below a predetermined level, said predetermined level being higher, relative to said reservoir portion, than said fuel pump inlet elevation.

8. The method as recited in claim 3, further comprising:
selecting said ejector pump to pump at a positive multiplicative rate of a powering pressured rate supplied thereto.

9. The method as recited in claim 8, further comprising:
selecting said ejector pump to have a capacity to deliver a pumped rate of approximately ten times the powering pressured rate supplied thereto.

10. The method as recited in claim 1, further comprising:
employing a flow-impeding partition in said fuel containment system, said flow-impeding partition being configured to establish said drainage rate.

11. The method as recited in claim 10, further comprising:
establishing said flow-impeding partition by adaptation of a structural rib within said wing of said aircraft.

12. The method as recited in claim 10, further comprising:
employing a recess in a top portion of said flow-impeding partition thereby establishing an overflow weir which during steady-state dispersion of fuel to said remote portion of said fuel containment system, establishes an overflow rate of fuel that spills thereover, and said overflow rate, together with a simultaneously occurring drainage rate establishing a return rate of fluid to said reservoir portion that substantially equals a simultaneously occurring pumped rate.

13. The method as recited in claim 10, further comprising:
utilizing an aperture in said flow-impeding partition to establish said drainage rate.

14. The method as recited in claim 13, further comprising:
controlling said drainage rate by adaptation to an aperture through said flow-impeding partition.

15. The method as recited in claim 13, further comprising:
accomplishing said adaptation to said aperture by restriction of flow therethrough by reduction of an open area thereof.

16. The method as recited in claim 15, further comprising:
locating a tubing segment in said aperture thereby restricting flow through said aperture.

17. The method as recited in claim 16, further comprising:
selecting said tubing segment to be composed of at least semi-flexible material and having an outer periphery that establishes a conformance-fit with an inner periphery of said aperture upon location by insertion of said tubing segment into said aperture.

18. The method as recited in claim 1, further comprising:
selecting said pumped rate to be approximately twice said drainage rate.

19. The method as recited in claim 1, further comprising:
causing said pumping of fuel from said reservoir portion to said remote portion to automatically begin, without input from an operator, upon said pressured fuel supply's initiation.

* * * * *